United States Patent
Wimberly et al.

(10) Patent No.: US 6,458,491 B1
(45) Date of Patent: Oct. 1, 2002

(54) SEPARATOR FOR ENERGY STORAGE CELLS

(75) Inventors: Robert A. Wimberly, Milligan College; Michael E. Gilchrist, Johnson City, both of TN (US)

(73) Assignee: Microporous Products, LP, Piney Flats, TN (US)

( * ) Notice: Subject to any disclaimer, the term of this patent is extended or adjusted under 35 U.S.C. 154(b) by 131 days.

(21) Appl. No.: 09/669,866

(22) Filed: Sep. 15, 2000

(51) Int. Cl.[7] ................................................. H01M 2/16
(52) U.S. Cl. ....................... 429/254; 429/251; 429/252; 429/247; 429/248; 429/249; 429/225; 29/623.1
(58) Field of Search ................................ 429/225, 254, 429/247, 248, 249, 251, 252; 29/623.1

(56) References Cited

U.S. PATENT DOCUMENTS

| | | |
|---|---|---|
| 2,043,954 A | 6/1936 | Kershaw |
| 2,046,015 A | 6/1936 | Bunbury et al. |
| 2,913,512 A | 11/1959 | Sundberg et al. |
| 3,020,597 A | 2/1962 | Smith-Johannsen |
| 3,158,532 A | 11/1964 | Pall et al. |
| 4,213,815 A * | 7/1980 | Goldberg et al. ...... 156/244.11 |
| 4,245,689 A | 1/1981 | Grard et al. |
| 4,681,750 A | 7/1987 | Johnson et al. |

FOREIGN PATENT DOCUMENTS

| | | |
|---|---|---|
| GB | 332525 | 7/1930 |
| GB | 486641 | 6/1938 |
| GB | 591633 | 8/1947 |
| GB | 719400 | 12/1954 |
| GB | 770915 | 3/1957 |
| GB | 808964 | 2/1959 |
| GB | 817079 | 7/1959 |
| GB | 880739 | 10/1961 |

OTHER PUBLICATIONS

"Latex Foam Compounding and Processing" The Vanderbilt News vol. 23, No. 1 Jan. 1957.
"Latex Foam Rubber" B.C. Blackley pp. 229–326 (Date Unknown).
"Latex Foam Compounding & Processing" (Date Unknown).

* cited by examiner

Primary Examiner—Patrick Ryan
Assistant Examiner—Angela J Martin
(74) Attorney, Agent, or Firm—Luedaka, Neely & Graham P.C.

(57) ABSTRACT

The invention provides a separator for an energy cell which includes a compressible web made from a blend of elastomeric material and cross-linking agent, the elastomeric material being selected from natural rubber and a mixture of natural rubber and synthetic rubber. The blend is expanded, cast and cured to form a web containing micropores so that the resulting web comprises an open cell structure having a thickness ranging from about 40 to about 150 mils, an alcohol porosity of from about 45 to about 90% and a compressibility of at least about 20%. Lead-acid battery cells containing the separators have the advantage of significantly improved life as a result of the improved strength and resiliency of the separator.

28 Claims, 2 Drawing Sheets

SEPARATOR FOR ENERGY STORAGE CELLS

FIELD OF THE INVENTION

The invention relates to microporous separators and in particular to improved separators for use in energy storage cells, particularly lead acid batteries.

BACKGROUND OF THE INVENTION

A conventional flooded lead-acid cell produces stoichiometric quantities of hydrogen and oxygen during the recharging process. Hydrogen and oxygen gases generated as a result of the electrolytic decomposition of the water in the cell eventually lead to significant water loss and the need for cell maintenance. Calcium-based lead grid alloys have reduced the water loss problem but have not eliminated such water loss. The inherent gassing problem associated with lead-acid cells historically prevented conventional flooded lead-acid cells from being operated as a "sealed" cell like other battery systems such as nickel cadmium.

Sealed lead-acid cells are based on gelled electrolyte technology (Gel-Cell). These cells utilize a jelly-like mixture of sulfuric acid/fumed silica, a leaf separator between the plates of the cells made of polyethylene, polyvinylchloride and the like and use a low pressure, unidirectional relief valve to produce internal gas recombination known as a "recombinant cell design". The key motivation for a recombinant cell design is to produce a cell with liquid electrolyte in the plates and voids containing semi-solid electrolyte between the plates. These voids or "cracks" are believed to enhance gas recombination by serving as pathways for gas movement from the positive plate to the negative plate. In this way a cell plate ratio is established so that the positive plates become fully charged before the negative plates. The oxygen produced at the fully charged positive plate fills the voids in the gelled electrolyte and ultimately reaches the surface of the negative plate. The net effect is to inhibit hydrogen evolution through its conversion or "recombination" with oxygen to form water. Cells designed with this technology showed excellent life under continuous float charge conditions and have found many applications in emergency lighting and standby power systems. A significant disadvantage of the recombinant cell technology relates to the absence of acceptable high rate discharge performance of the cells due to the relatively high electrical resistance of the electrolyte/separator system.

An improvement in sealed lead-acid cell is a "starved" cell utilizing nonwoven glass mat separators as described in U.S. Pat. No. 3,862,861 to McClelland et al. Starved energy cells operate on an oxygen recombination cycle, as does the Gel-Cell, but offer higher rate performance due to the lower electrical resistance of the nonwoven glass mat separator.

The glass mat separators are fabricated from 100 wt.% glass micro fibers similar to those used in the manufacture of fiberglass insulation. The fibers are formed into a binderless, nonwoven mat or felt with the use of wet-laid papermaking technology and equipment. During the manufacture of the cells, the glass mat separators are compressed between the positive and negative plates of the lead-acid cell. The glass mat separators have a high rate of wetting and therefore readily absorb and retain the liquid sulfuric acid electrolyte between the battery plates. The cells are designed so that less than 100% of the separator pore volume is filled with electrolyte (i.e., "starved") and in this manner the separators facilitate gas movement and facilitate oxygen and hydrogen recombination. A disadvantage of a cell of this design is the relatively high porosity of the separators which tends to cause poor dendrite protection and extremely high recombination rates. At higher levels of recombination, thermal runaway and negative self-discharge become insidious problems. Also, glass mat separators tend to be difficult to handle and easily torn or punctured during battery cell assembly To a certain degree, conventional flooded lead-acid cells exhibit gas recombination. This is due to the fact that the gaseous oxygen is slightly soluble in the electrolyte and therefore is able to reach the surface of the negative plate via diffusion and convection. The degree of oxygen recombination in flooded cells is dependent on the type of separator used in the cell. For example, measured recombination rates are higher in cells employing microporous polyethylene separators than in cells using microporous rubber-based separators. A possible explanation for the rate difference between a polyethylene separator and a rubber-based separator is that polyethylene separators are more highly porous materials than the rubber-based separators leading to increased oxygen migration through the electrolyte. Another possible explanation is that the oxygen recombination reaction is partially inhibited by the presence of soluble compounds in the microporous rubber-based separators which are absorbed on the surface of the negative plates of the cell thereby affecting the surface chemistry of the negative plate during a recharge. Accordingly, there continues to be a need for an improved energy cell which exhibits improved high rate discharge performance and lower electrical resistance.

SUMMARY OF THE INVENTION

With regard to the above and other objects and advantages, the invention provides a separator for an energy cell which includes a substantially compressible web made from a blend containing an elastomeric material selected from natural rubber and a mixture of natural rubber and synthetic rubber and a cross-linking agent, the blend being expanded, cast and cured to form a web containing micropores so that the resulting web comprises an open cell structure having a thickness ranging from about 40 to about 150 mils, an alcohol porosity of from about 45 to about 90% and a compressibility of at least about 20%.

In another aspect, the invention provides a method for making a separator for an energy-cell which includes, blending an elastomeric material selected from natural rubber and a mixture of natural rubber and synthetic rubber with a cross-linking agent, expanding the blend, and then curing said blend to form a substantially homogeneous web containing micropores so that the resulting web comprises an open cell structure having a thickness ranging from about 40 to about 150 mils, an alcohol porosity of from about 45 to about 90% and a compressibility of at least about 20%.

Another aspect of the invention provides an essentially maintenance free lead-acid battery cell which includes a cell container made of a polymeric material, at least one positive electrolytic plate and at least one negative electrolytic plate disposed in the container, an acidic electrolyte solution and a microporous compressible separator compressed between the positive plate and negative plate, the separator consisting essentially of a substantially compressible web made from an elastomeric material selected from natural rubber and a mixture of natural rubber and synthetic rubber, the elastomeric material being blended with a cross-linking agent, the blend being expanded, cast and cured to form a substantially homogenous compressible web containing micropores so that the resulting web comprises an open cell structure having a thickness ranging from about 40 to about 150 mils, an alcohol porosity of from about 45 to about 90% and a compressibility of at least about 20%.

An advantage of the separators according to the invention is that the separators are readily compressible enabling easier cell assembly and the separators retain their resiliency over the life of the energy storage cell enabling longer life operation of energy cells, such as rechargeable sealed lead-acid battery cells containing the separators, particularly lead-acid battery cells operating on a gas recombination cycle. The separators made according to the invention also tend to attenuate the recombination reaction thus decreasing the tendency for a thermal runaway reaction or self-discharge of the negative plates.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE PREFERRED EMBODIMENTS

Figure 1:
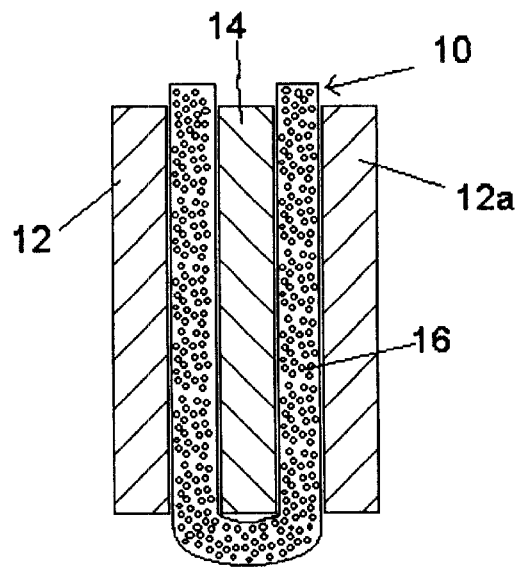
FIG. 1 is a cross-sectional view, not to scale of an energy cell separator according to the invention disposed between positive and negative plates of a battery.
Figure 2:
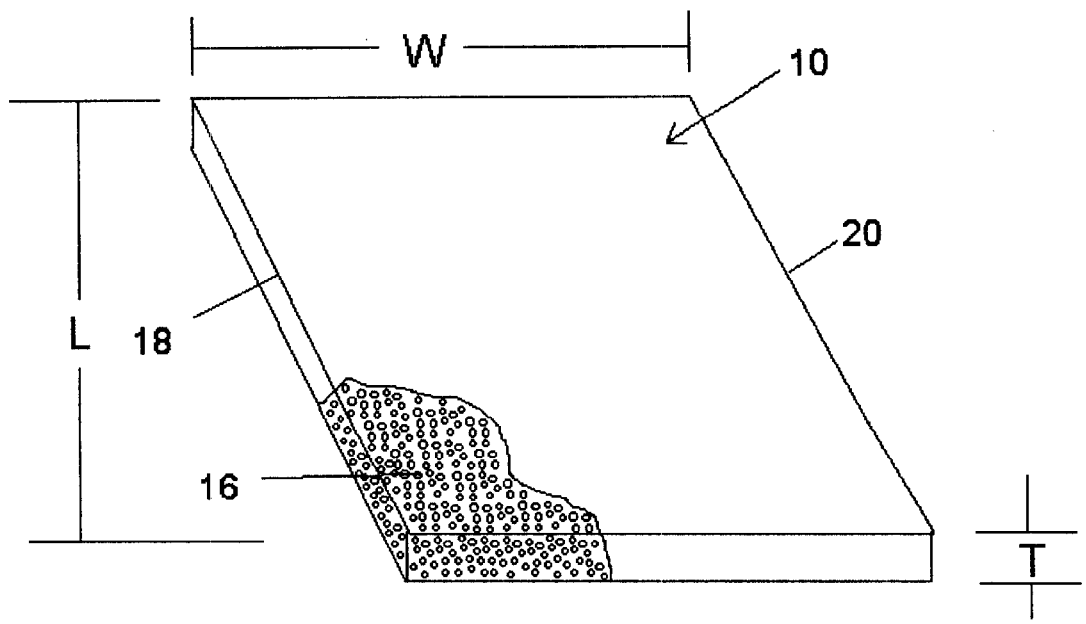
FIG. 2 is a perspective view of an energy cell separator according to the invention.

With reference to FIGS. 1 and 2, the invention provides an energy cell separator 10 for use in a rechargeable energy cell such as a lead-acid battery which may be sealed or unsealed and starved or flooded. The separator 10 is disposed between negative plates 12 and 12a and a positive plate 14, preferably by folding the separator 10 around one side of the positive plate 14 in the manner indicated in FIG. 1. It is preferred not to seal the edges 18 and 20 of the separator to one another. While the separator 10 is shown in FIG. 1 as being disposed only between two negative plates 12 and 12a, it will be recognized that a substantially longer separator web may be used and disposed between multiple cell plates in an accordion-like manner.

The separator 10 is preferably made from a natural elastomeric material or a mixture of natural and synthetic elastomeric materials which has been expanded so as to be substantially absorbent whereby it absorbs and/or retains an amount of electrolyte when used in an energy cell between positive and negative electrolytic plates thereof. A particularly preferred separator 10 is comprised of a natural elastomeric material or mixture of natural and synthetic elastomeric materials which have been cured after expansion to provide a substantially homogenous, resilient, flexible web containing micropores 16. A web for use as an energy cell separator has a thickness T ranging from about 40 to about 150 mils, preferably from about 50 to about 100 mils and most preferably from about 65 to about 85 mils and has a compressibility of at least about 20%, preferably at least about 30% and most preferably from about 30 to about 40%. The length L and width W of the web 10 are not critical to the invention and thus may vary within wide limits depending on the size energy cell in which the separator 10 is used.

For the purposes of the invention, web "compressibility" means that the web may be elastically compressed so that the thickness T of the web 10 compared to its initial uncompressed state is reduced when the web 10 is compressed between the positive and negative plates 12 and 14 of the energy cell. The percentage compressibility is the percentage thickness reduction in web thickness T as a result of compressing the web 10. The upper limit on the compressibility of the web 10 is a function of the porosity of the web 10 after compression and the ability of the compressed web 10 to absorb and retain an electrolyte solution. It will be recognized that regardless of the uncompressed porosity of the web 10, compression of the web 10 beyond a reasonable limit may significantly reduce the porosity of the web 10 and therefore its ability to absorb and retain electrolyte.

In a preferred method for manufacturing a separator 10 having micropores 16 therein, an elastomeric material selected from natural latex rubber lattices and a mixture of natural latex rubber and synthetic latex rubber lattices are compounded, expanded and cured. The natural latex rubber lattices are preferably selected from natural latex grades of rubber of either the high or low ammonia types. A preferred natural latex rubber is available from Firestone Natural Rubber Co. of Akron, Ohio under the trade name HARTEX 101 Natural Rubber latex. The synthetic rubber lattices are preferably selected from styrene-butadiene rubber (SBR) synthetic lattices. It is preferred that the elastomeric material contain from about 60 to about 100 % by weight natural latex rubber lattices and from about 0 to about 40 % by weight synthetic rubber lattices.

The elastomeric material is blended in a propeller bladed mixer with compounding materials added in a specified order. The compounding materials include a curing agent, cure accelerators, foam promoters, foam stabilizers, antioxidants, fillers and the like. The curing agent is selected from sulfur or dibenzoyl peroxide or may be selected from cure accelerators including, but not limited to, dicumyl peroxide, p-quinone dioxime, 1,3-diphenylguanidine, ethylene-thiourea (2-imidazolidinethione), tetramethylthiuram disulfide, tetramethylthiuram monosulfide, trinitrobenzene, chloranilphenolic-resins, 4,4'-dithiobismorpholine, dithiophosphates such as zinc O,O-di-n-butylphosphorodithioate and benzothiazoles such as 2-mercaptobenzothiazole, bis(2,2-benzothiazolyl) disulfide, N-tert-butyl-2-benzothiazolesulfenamide, N-cyclohexyl-2-benzothiasole- sulfenamide, 2-(4-morpholinylthiobenzothiazole) and 2-(4-morpholinylditho)-benzothiazole. A preferred curing agent is an aqueous dispersion of sulfur, sodium salts of polymerized alkylnaphthalenesulfonic acid and ammonium hydroxide such as a sulfur dispersion available from Akron Dispersions of Akron, Ohio under the If trade name BOSTEX 410. The amount of curing agent compounded with the elastomeric material preferably ranges from about 1 to about 5 parts by weight per 100 parts by weight of elastomeric material.

When sulfur is used as the curing agent, it is preferred to include a vulcanization accelerator in the blend. A preferred vulcanization accelerator is a metal dialkyldithiocarbamate such as an aqueous dispersion of zinc diethyldithiocarbamate and sodium salts of polymerized alkylnaphthalenesulfonic acid available from Akron Dispersions under the trade name BOSTEX 561. Thiazoles are preferably used in conjunction with the vulcanization accelerator as a secondary accelerator. Preferred thiazoles include aqueous dispersions of zinc 2-mercaptobenzthiazole (ZMBT) and sodium salts of polymerized alkylnaphthalenesulfonic acid available from Akron Dispersions under the trade name BOSTEX 482A. The amount of vulcanization accelerator in the blend preferably ranges from about 0.5 to about 2 parts by weight per 100 parts by weight elastomeric material. The secondary accelerator preferably ranges from about 0.25 to about 1.25 parts by weight per 100 parts of elastomeric material in the blend.

The foam promoters are selected from carboxylate soaps such as oleates, ricinoleates, caster-oil soaps and resinates, and combinations thereof. The preferred foam promoter comprises an aqueous sodium or potassium soap of oleic acid or caster oil. Such soaps are available from Akron Dispersions, Inc. of Akron, Ohio. The amount of soap in the blend preferably ranges from about 0.2 to about 2 parts by weight per 100 parts by weight of elastomeric material in the blend.

The foam stabilizers are selected from quaternary ammonium surface-active compounds and betaines, amino compounds and amine oxides, organic hydroxy compounds, water-soluble hydrocolloids and the like. Quartemary ammonium surface-active compounds include n-hexadecyltrimethylammonium bromide, n-hexadecylpyridinium bromide and n-dodecyltri(2-hydroxyethyl)ammonium hydroxide. A preferred betaine compound is C-n-hexadecyl betaine. Examples of amino compounds and amine oxides include diphenylguanidine, triethyltrimethylenetriamine, triethylenetetramine, tetraethylenepentamine and n-hexadecyldimethylamine oxide. A particularly preferred foam stabilizer is diphenylguanidine which is preferably used in an amount ranging from about 0.2 to about 1.0 parts by weight per 100 parts by weight of elastomeric material.

Antioxidants are also preferably included in the blend. Antioxidants may be selected from N,N'-di-2-naphthyl-p-phenylenediamine and 2,2'-methylene bis (4-methyl-6-tert-butylphenol). The amount of antioxidant in the blend preferably ranges from about 1 to about 5 parts by weight per 100 parts by weight elastomeric material.

Fillers such as silica, carbon black, calcium carbonates and kaolinite clays may optionally be included in the blend. A preferred filler is precipitated silica which is used in an amount ranging from about 10 to about 30 parts by weight per 100 parts by weight of elastomeric material.

Figure 3:
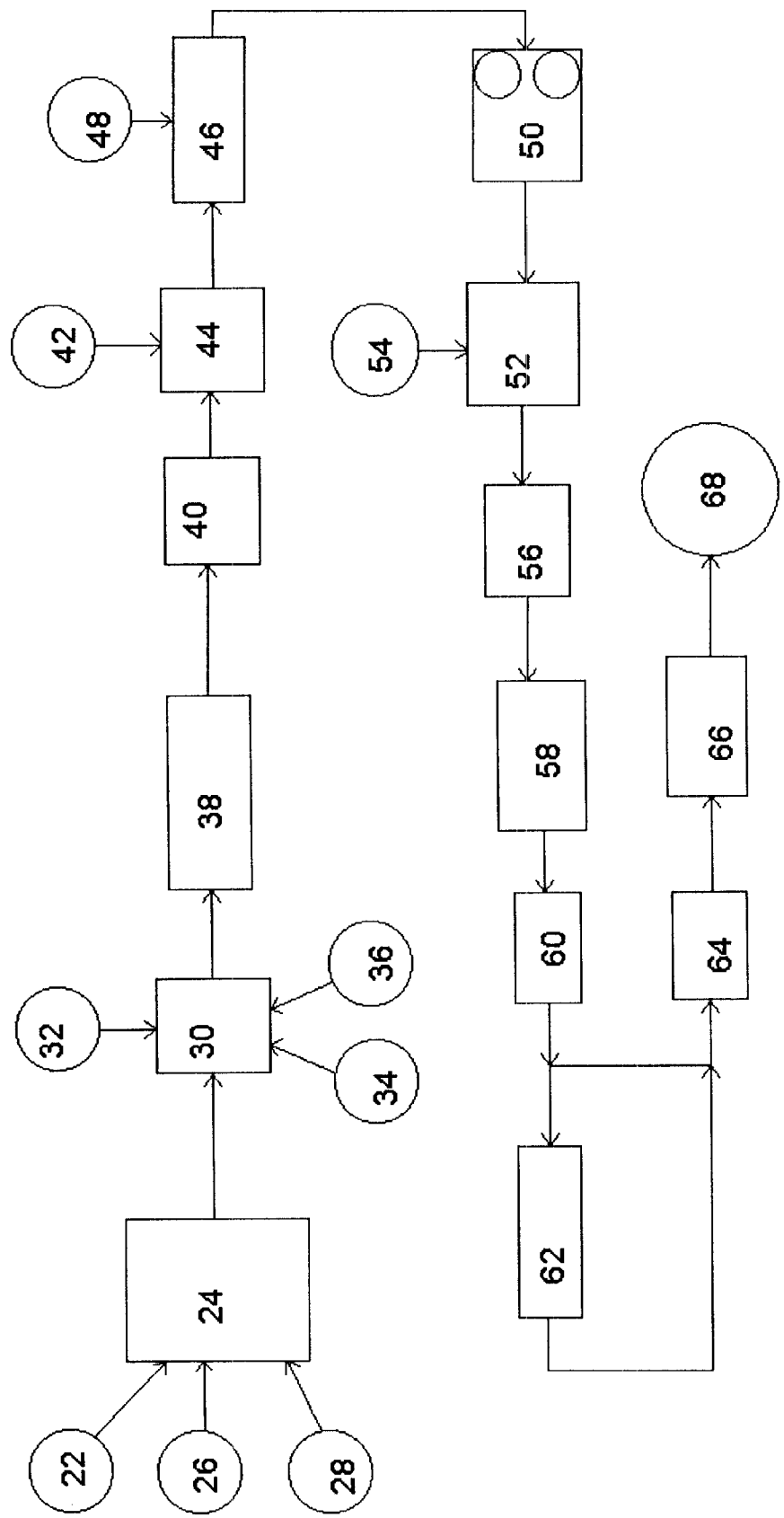
FIG. 3 is a schematic diagram of a process for making microporous elastomeric separators according to the invention.

With reference to FIG. 3, a process for preparing an elastomeric blend for expansion and curing will now be described. According to the process, an elastomeric material selected from natural rubber lattices and a mixture of natural and synthetic rubber lattices 22 is provided to a mixer 24. A curing agent 26 is also added to the mixer 24 along with one or more cure accelerators, foam promoters, foam stabilizers, antioxidants, fillers and the like 28. The mixer 24 used to prepare the blend is preferably a simple propeller bladed mixer using mixing speeds ranging from about 1200 to about 2000 rpm. Mixing should be conducted under conditions whereby a vortex in the blend is avoided. Mixing time generally ranges from about 15 to about 20 minutes. Mixing temperatures preferably range from about 24 to about 38° C.

After thoroughly mixing the components in the mixer, the blend is allowed to go through a maturation period of 1–3 days under gentle agitation at a temperature ranging from about 24 to about 38° C. in the same mixer 24 or in a separate mixer prior to being expanded and cured. The maturation period is provided to reduce the ammonia content of the elastomeric blend to an amount ranging from about 0.13 to about 0.15 wt.%. A reduction in ammonia content of the elastomeric blend is conducted in a conventional manner by blowing moist air over the surface of the material while continually exposing new surfaces to moist air. Total alkalinity, expressed as the percent by weight of ammonia equivalent is determined by a potentiometric titration of the elastomeric material to 5.0 pH using 0.1 N HCl. The total alkalinity as wt.% ammonia is given by the following equation:

$$\text{Total Alkalinity (as wt.\% NH}_3) = (1.7 \times N \times V)/M \qquad \text{(I)}$$

wherein N is the normality of the HCl, V is the volume of HCL to reach a pH of 5.0 and M is the weight of the sample before titration.

After maturation the resulting blend is then fed into the batch or continuous mixer/foamer 30. A preferred mixer/foamer 30 for producing expanded elastomeric material on a continuous basis is an OAKES Model 10MT51A available from E. T. Oakes Corporation of Hauppauge, New York. The Model 10MT51A includes a mixer head assembly driven by a 5 horsepower variable speed motor having an adjustable speed range of from 136 to 540 rpm and has a capacity to produce from about 150 to about 1000 pounds per hour of expanded elastomeric material. Larger or smaller continuous mixer/foamers 30 and batch mixer/foamers may also be used.

Air 32 is introduced to the foaming head of the mixer/foamer 30 along with foam stabilization compound 34 and gellation compound 36. The amount of air introduced into the foaming head should be sufficient to expand the elastomeric material on a volume basis more than about 11 times based on the initial volume of elastomeric material. It is particularly preferred to provide a cured expanded elastomeric material having a density below about 0.06 grams/cm$^3$. Accordingly, the expansion ratio of the elastomeric blend is preferably in the range of from about 15:1 to about 25:1 or higher. Air 32 is preferably provided continuously to the mixer/foamer 30 at a pressure ranging from about 75 to 80 psig.

The gellation compound 36 is preferably an aqueous dispersion selected from alkali-metal silicofluorides and ammonium peroxodisulphate. The preferred gellation compound is sodium silicofluoride which is available from Akron Dispersions under the trade name BOSTEX 580A. Other gellation compounds 36 which may be used include the sodium, potassium and ammonium salts of fluorotitanic acid. The amount of gellation compound used in the mixer/foamer preferably ranges from about 1.0 to about 10 parts by weight per 100 parts of elastomeric material. The foam stabilization compound 34 is preferably an aqueous dispersion of zinc oxide and alkali-metal salts of polymerized alkylnaphthalenesulfonic acid such as the aqueous dispersion of zinc oxide available from Akron Dispersions under the trade name BOSTEX 422. The amount of zinc oxide dispersion in the mixer/foamer preferably ranges from about 3 to about 10 parts by weight per 100 parts of elastomeric material. The foam stabilization compound 34 and gellation compound 36 are preferably metered into the mixer/foamer 30 during the expansion operation which is preferably conducted at room temperature.

The elastomeric material may also be expanded by use of compressed gases such as nitrogen or carbon dioxide. In the alternative to the use of air or compressed gases, other foaming agents may be used to expand the elastomeric material to provided an expanded elastomeric material having a density below about 0.06 grams/cm$^3$. Such chemical foaming agents include, but are not limited to volatile liquids such as fluorinated aliphatic hydrocarbons, chlorofluorocarbon liquids, methylene chloride and chemical foaming agents such as sodium bicarbonate, azodicarbonamide, p,p'-oxybis(benzenesulfonyl hydrazide), p-toluene sulfonyl semicarbazide, trihydrazine triazine and 5-phenyltetrazole.

When a chemical foaming agent is used, it is important that any residual amount of foaming agent in the expanded elastomeric product be sufficiently low so as not to interfere with the performance of the separator 10 in an energy cell.

After mixing and expanding the elastomeric material in the mixer/foamer 30, the expanded mixture is fed to a slab casting mold 38 to provide a substantially elongate web of expanded elastomeric material for curing. The slab casting mold is preferably an aluminum mold or other corrosion resistant metal mold having acceptable release properties such as metal alloys having a low copper content. Mold release may be obtained by spraying the mold surface with a mold release agent such as carbowax polyethylene glycol.

The mold 38 is preferably held for a short period of time, preferably from about 3 to about 10 minutes in a gelling chamber 40 to permit some gellation of the expanded elastomeric material to occur prior to curing. Curing is preferably conducted by heating with steam 42 in a steam curing station 44. In the alternative, crosslinking of the expanded elastomeric material may be conducted using electron beams, microwaves or ultraviolet light provided the expanded elastomeric formulation is suitable for such curing process. Steam or curing temperatures in the range of from about 90 to about 110° C. are typically used. The vulcanization or crosslinking reaction typically takes from about 10 to about 30 minutes to complete at the elevated temperatures depending on the thickness and density of the foamed elastomeric block or web.

After curing, the cured expanded elastomeric material is conducted to a wash system 46 wherein water 48 is applied to the cured material to remove any soluble salts and excess reaction components from the expanded material.

Washing of the expanded elastomeric material may be conducted using water sprays or by soaking the material in running water for 20 to 30 minutes or more or squeezing the material through rolls submerged in water. The expanded material is then conducted to squeeze rolls 50 to remove water from the material. A hot air dryer 52 supplied with hot air 54 at a temperature ranging from about 60 to about 85° C. or a high frequency dielectric heating system is used to dry the squeezed elastomeric material. After drying, the elastomeric material is cooled in a cooling station 56 using chilled air.

If the expanded and cured elastomeric material is in the form of a relatively thick slab, thin webs of the material may be made by using of a web splitter 58 and web slitter 60. The slab of elastomeric material is conducted to a web slitter 58 such as a Model BSV-S available from Baumer of America, Inc. of Towaco, N.J. The Model BSV-S is a continuous loop horizontal splitting machine. The slit web preferably has a substantially uniform thickness ranging from about 40 to about 150 mils. Optionally, the slit web may be conducted to a scrim laminator 62 to apply a backing sheet to the slit web prior to rolling. An inspection station 64 is preferably provided after the slitting machine 60 to insure uniform web production. The web is then conducted to a coiling system 66 for production of coiled rolls 68 containing the expanded elastomeric web.

A preferred use for the battery separators according to the invention is in recombinant lead-acid energy cells. Recombinant lead-acid cells are described, for example, in U.S. Pat. No. 3,862,861 to McClelland et al. and U.S. Pat. No. 5,851,695 to Misra et al. which are incorporated herein by reference as if fully set forth.

The following non-limiting examples provide further details with regard to making substantially homogeneous elastomeric separators according to the invention.

EXAMPLE

According to the formulation given in the following table, Component A was mixed in a drum using a slow speed propeller mixer rotating at a speed which did not produce a vortex in the blend. Mixing was conducted for 20 minutes at a temperature of about 38° C. The mixture was then matured for 3 days at a temperature of about 38° C. to provide a blend having an ammonia content of less than about 0.15% by weight.

After maturation, the de-ammoniated blend was conducted to a Oakes Model 2MT.5A mixer foamer for expansion of the blend. The blend was expanded with air so that the product had a density of 0.04 to about 0.045 grams/cm$^3$. Component B was added to the mixer/foamer during the expansion step. The expanded blend was molded, gelled, cured, cleaned, dried and slit as described above.

TABLE 1

NATURAL RUBBER FORMULATION

| | Parts by Weight | | | |
| --- | --- | --- | --- | --- |
| | I | | II | |
| Ingredient | Dry | Actual | Dry | Actual |
| COMPONENT A | | | | |
| Natural rubber latex | 100 | 167 | 100 | 167 |
| Potassium oleate (20 wt. %) | 0.5 | 2.5 | 1.5 | 4.5 |
| Sulfur (50 wt. %) | 2.5 | 5 | 2 | 4 |
| Zinc diethyl dithiocarbamate (50 wt. %) | 1 | 2 | 1 | 2 |
| Zinc mercaptobenzthiazolate (50 wt. %) | 0.75 | 1.5 | 0.5 | 1 |
| Precipitated silica | — | — | 20 | 30 |
| Diphenyl guanidine (50 wt. %) | 0.3 | 0.6 | 0.75 | 1.5 |
| N,N'-di-β-naphthyl-p-phenylene Diamine (25 wt. %) | 1 | 4 | 1 | 4 |
| COMPONENT B | | | | |
| Air[1] | — | — | — | — |
| Zinc oxide (50 wt. %) | 3 | 6 | 5 | 10 |
| Sodium silicofluoride (20 wt. %) | 1.0 | 5.0 | 1.5 | 7.5 |

[1]Sufficient air is provided to produce an expanded web having a density ranging from about 0.04 to about 0.045 grams/cm$^3$.

The cured open cell foam material made from the foregoing formulations according to the procedure described above showed excellent compressibility, resiliency and acid resistance when used as a separator in a valve regulated lead-acid battery. A separator made according to the formulations in Table 1 was compared to an absorptive microglass fiber battery separator (AGM). The properties of the separators are listed in Table 2.

In Table 2, the ECC test for the separators was conducted using a potentiostat with an output capability of ±5 volts and ±1 ampere with the capability of raising or lowering the voltage of the potentiostat at a rate of 200 mv per minute linear sweep rate. An X-Y recorder capable of recording 100 and 200 millivolts per inch on the X axis and 5, 10, and 20 millivolts per inch on the Y axis and having a minimum input impedance of 100 megohms was used to record the test results. All electrical connections between the electronic instruments and the test cell were made with shielded cable.

The cell apparatus consisted of a synchronous rotator capable of a constant rotation speed of 600±10 rpm having a hollow shaft chuck with locking nuts to accommodate electrodes having 6.35 millimeter diameter electrode stems. The electrolysis vessel was equipped with a sealed-in fritted glass disk at the end of the horizontal section nearest the sample compartment with a stopcock at the bottom of the sample chamber. The reference electrode was a mercury/mercurous sulphate electrode. The counter electrode was a pure lead rod ¼ inch in diameter by 5 inches long which was immersed in the electrolyte of the cell. The rotating disc electrode was made from pure lead ¼ inch diameter rod. The rotating disc electrode rod was concentrically sealed in epoxy ½ inch in diameter.

The extraction apparatus consisted of a variable transformer with a 380 watt hemispherical mantle regulated at 71° C., 1000 mL two-necked round bottom flask and a 300 mL LEIBIG condenser with ground glass joints and stoppers. A miniature machine lathe was used to face the rotating disc electrode at 88° to the rotational axis of the electrode.

According to the procedure, ACS grade sulfuric acid was added to dionized water to obtain a specific gravity of 1.210±0.005. Battery separator material cut to provide a ⅜ inch square sample weighing 2.5 grams was placed in a 1000 mL round bottom flask. The sample was leached in 400 mL of pre-electrolysis acid (1.210 specific gravity sulfuric acid for 1 week at 71° C.±2° C. The leached sample was cooled and the leach liquid was transferred to an appropriate size holding flask which was thoroughly cleaned rinsed with dionized water.

The potentiostat was electrically connected to the rotating disc electrode where potentials were programmed to rise cathodically or anodically at a linear rate of 200 millivolts/minute. The polarity of the potentiostat was such that an increase in potential was obtained as the sample was scanned toward the upper current limit, 3 millamps cathodic and 5 milliamps anodic current. The electrolysis cell was filled with 120 mL of 1.210 specific gravity sulfuric acid and the reference electrode tip was set approximately ½ inch from the bottom of the lead disc which was immersed approximately ½ inch into the acid electrolyte. Both electrodes were approximately centered in the sample compartment.

With the disc electrode rotating at 600 rpm, the potentiostat was activated to start the potential sweep at ±0.800 volts with a linear increase in voltage of 200 millivolts per inch. The cathodic sweeps were continued until the cell current reached 3 milliamps. At this potential of the disc electrode, the current was between 1.7 and 1.8 volts with visual evidence of hydrogen evolution. At 3 milliamps a reverse sweep direction was initiated to return the electrode potential to its initial value of −0.800 volts. This voltage current scan constituted 1 cycle in which the electrode was charged, polarized and discharged.

The lead disc electrode was cycled in pure sulfuric acid and the disc electrode potentials at 2 and 3 milliamps were recorded. Cycling was continued until at least 4 cycles and until two successive readings at 2 and 3 milliamps did not vary by more than 10 millivolts. After reproducible successive voltage readings were obtained, the pure acid in the working disc electrode compartment was replaced with leach solution by draining off 80% of the pure acid to a level such that neither the glass frit was exposed nor the electrical continuity was lost and the cell was run through the voltage sweep at 2 and 3 milliamps. The voltage difference between the last pure acid and leach solutions at 2 and 3 milliamps was used to determine the electrochemical activity of the leachable components in the separator. The voltage difference was averaged and reported as change in cathodic polarization.

As with the beforementioned cathodic sweeps, the data obtained in acid leach solution was compared to that in pure acid for the anodic sweeps. Anodic voltage sweeps were conducted to a cell current of 5 milliamps which resulted in a disc voltage (after repeated cycling) of +1.5 to +1.6 volts. At 5 milliamps a reverse sweep direction was initiated to return the disc potential to its initial value of +0.800 volts. During this cycle, the electrode was charged, polarized and discharged.

Initially, 0.005 inches was machined off the face of the disc electrode and the electrode was gently sanded on continuously deionized water wetted 600 micron aluminum oxide sandpaper in a figure eight motion until the lead surface appeared uniformly abraded. The cleaned electrode was cycled (at least 5 cycles) in pure sulfuric acid until the variation between successive sweeps was less than 5 millivolts at 3, 4 and 5 milliamps. After reproducible cycles were obtained, the scan was stopped at +0.800 volts with current still flowing through the circuit and the disc rotator was stopped. The electrolysis cell was raised as high as possible to drain off 80% of the pure acid to a level such that neither the glass frit was exposed nor electrical continuity was lost. The working electrode compartment was refilled promptly to the original level with acid leach solution and the cell was lowered to its original position. The voltage sweep was restarted to obtain 1 cycle in the leach solution. Electrochemical activity in the anodic sweeps was determined similar to the cathodic procedure with the exception of obtaining potentials in the oxygen evolution region at 3, 4 and 5 milliamps. The voltage differences were averaged and reported as the change in anodic polarization

TABLE 2

| Properties | Latex Foam Separator | AGM Separator |
|---|---|---|
| Thickness (mm) | 3.3 | 1.4 |
| Basis weight (g/m$^2$) | 340–410 | 200–300 |
| Density (g/cc)[1] | 0.125 | 0.130 |
| Porosity (%) | 70–80 | 90–95 |
| Tensile strength (lbs) | 1.98 | 2.65 |
| Elongation (%) | 327 | 23 |
| Puncture (lbs) | 0.3 | 0.25 |
| Mercury Porosimetry | | |
| Total porosity (cc/g) | 0.92 | 3.822 |
| Mean Pore Diameter ($\mu$m) | 100 | 10 |
| Bulk Density (g/mL) | 0.501 | 0.175 |
| Total Pore Area (m$^2$/g) | 2.39 | 1.59 |
| ECC Test | Pass all | Pass all |
| Acid Weight Loss (%) | <1 | <1 |

[1]The density of the separators was determined according to ASTM D1055-90

As seen by the foregoing comparison, a separator made according to the invention exhibited lower mercury porosity than an AGM separator.

A natural latex foam separator having the properties indicated in the foregoing table was tested in a recombinant cell test facility to determine the discharge capacity of a cell containing the separator. The cell contained one positive plate (~70 grams of positive active material) and two lead negative plates. The separator was pre-compressed between 20 to 30% by volume between the plates of the cell. The test cell was filled with acid at 1.1 grams/mL under vacuum and 0.5 amps were applied to the cell for 22 hours. After the 22 hour period the acid was removed from the cell and cell was sealed. Capacity testing and float charging was conducted at 2.45 volts/cell. Nominal plate potentials versus mercury-mercurous sulfate reference electrode were 1.400 volts for the positive plate and 1.050 volts for the negative plates. Discharge testing was conducted at 1 amp down to 1.75 volts/cell. The results of the capacity testing and cell discharge testing are shown in Table 3.

TABLE 3

| Cycle | AGM Capacity (Ah) | Latex Foam Separator Capacity (Ah) |
|---|---|---|
| 1 | 4.37 | 3.34 |
| 2 | 4.44 | 3.53 |
| 3 | 4.52 | 3.68 |
| 4 | 4.38 | 3.76 |
| 5 | 4.45 | 3.90 |
| 6 | 4.40 | 3.99 |
| 7 | 4.27 | 4.01 |
| 8 | 4.27 | 4.06 |
| 9 | 4.19 | 4.09 |
| 10 | 4.19 | 4.08 |

Amp-Hour (Ah) capacities are at 1 amp discharge rate and 1.75 volts/cell cut-off.

As seen in the foregoing table, a latex foam separator has a comparable cell discharge capacity in a recombinant cell to that of an AGM separator. Accordingly, the latex foam separator of the invention may be used to replace an AGM separator in recombinant cells without a substantial change in cell performance.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A separator for an energy cell which consists essentially of a compressible web made from a blend of elastomeric material and cross-linking agent, the elastomeric material being selected from natural rubber and a mixture of natural rubber and synthetic rubber, the blend being expanded, cast and cured to form a web containing micropores so that the resulting web comprises an open cell structure having a thickness ranging from about 40 to about 150 mils, an alcohol porosity of from about 45 to about 90% and a compressibility of at least about 20%.

2. The separator of claim 1 wherein the elastomeric material comprises natural rubber.

3. The separator of claim 1 wherein the elastomeric material comprises a mixture of 60 wt.% natural rubber and 40 wt.% synthetic rubber.

4. The separator of claim 1 wherein the cross-linking agent comprises a vulcanizing agent.

5. The separator of claim 1 wherein the blend is cured by vulcanization with sulfur.

6. The separator of claim 1 wherein the blend contains a sulfur donor cross-linking agent such as tetramethylthiuram disulfide.

7. The separator of claim 1 wherein the elastomeric blend is cross-linked by electron beam, UV or microwave radiation.

8. The separator of claim 1 wherein the blend is mechanically expanded by blowing air into the blend.

9. The separator of claim 1 wherein the blend contains silica as a filler.

10. A method for making a separator for an energy cell which comprises, blending an elastomeric material selected from natural rubber and a mixture of natural rubber and synthetic rubber with a cross-linking agent, expanding the blend, and curing the expanded blend to form a substantially homogeneous web containing micropores so that the resulting web comprises an open cell structure having a thickness ranging from about 40 to about 150 mils, an alcohol porosity of from about 45 to about 90% and has a compressibility of at least about 20%.

11. The method of claim 10 wherein the elastomeric material comprises natural rubber.

12. The method of claim 10 wherein the elastomeric material comprises 60 wt.% natural rubber and 40 wt.% synthetic rubber.

13. The method of claim 10 wherein the expanded blend is cross-linked using a vulcanizing agent.

14. The method of claim 13 wherein the vulcanizing agent comprises sulfur.

15. The method of claim 13 wherein the vulcanizing agent comprises a sulfur donor such as tetramethylthiuram disulfide.

16. The method of claim 10 wherein the expanded blend is cross-linked by electron beam, UV or microwave radiation.

17. The method of claim 10 wherein the blend is mechanically expanded by blowing air into the blend.

18. The method of claim 10 wherein the foamed blend contains silica as a filler.

19. An essentially maintenance free lead-acid battery cell which comprises a cell container made of a polymeric material, at least one positive electrolytic plate and at least one negative electrolytic plate disposed in the container, an acidic electrolyte solution and a microporous compressible separator compressed between the positive plate and negative plates, the separator consisting essentially of a substantially compressible web made from an elastomeric material selected from natural rubber and a mixture of natural rubber and synthetic rubber, the elastomeric material being blended with a cross-linking agent and the blend being expanded, cast and cured to form a substantially homogeneous compressible web containing micropores so that the resulting web comprises an open cell structure having a thickness ranging from about 40 to about 150 mils, an alcohol porosity of from about 45 to about 90% and a compressibility of at least about 20%.

20. The lead-acid battery cell of claim 19 wherein the elastomeric material comprises natural rubber.

21. The lead-acid battery cell of claim 19 wherein the elastomeric material comprises a mixture of 60 wt.% natural rubber and 40 wt.% synthetic rubber.

22. The lead-acid battery cell of claim 19 wherein the blend contains a vulcanizing agent.

23. The lead-acid battery cell of claim 19 wherein the blend is cured by vulcanization with sulfur.

24. The lead-acid battery cell of claim 19 wherein the blend is cured by vulcanization with a sulfur donor such as tetramethylthiuram disulfide.

25. The lead-acid battery cell of claim 19 wherein the blend is mechanically expanded by blowing air into the blend.

26. The lead-acid battery cell of claim 19 wherein the expanded blend contains silica as a filler.

27. The lead-acid battery cell of claim 19 wherein the lead-acid battery cell is a is a sealed or valve regulated lead-acid battery cell.

28. The lead-acid battery cell of claim 27 wherein the lead-acid battery cell is a valve-regulated energy cell.

* * * * *